June 17, 1958     C. L. DUNNING     2,839,359
PROCESS FOR TREATING CHROMIUM-BEARING ORES
Filed Aug. 21, 1953
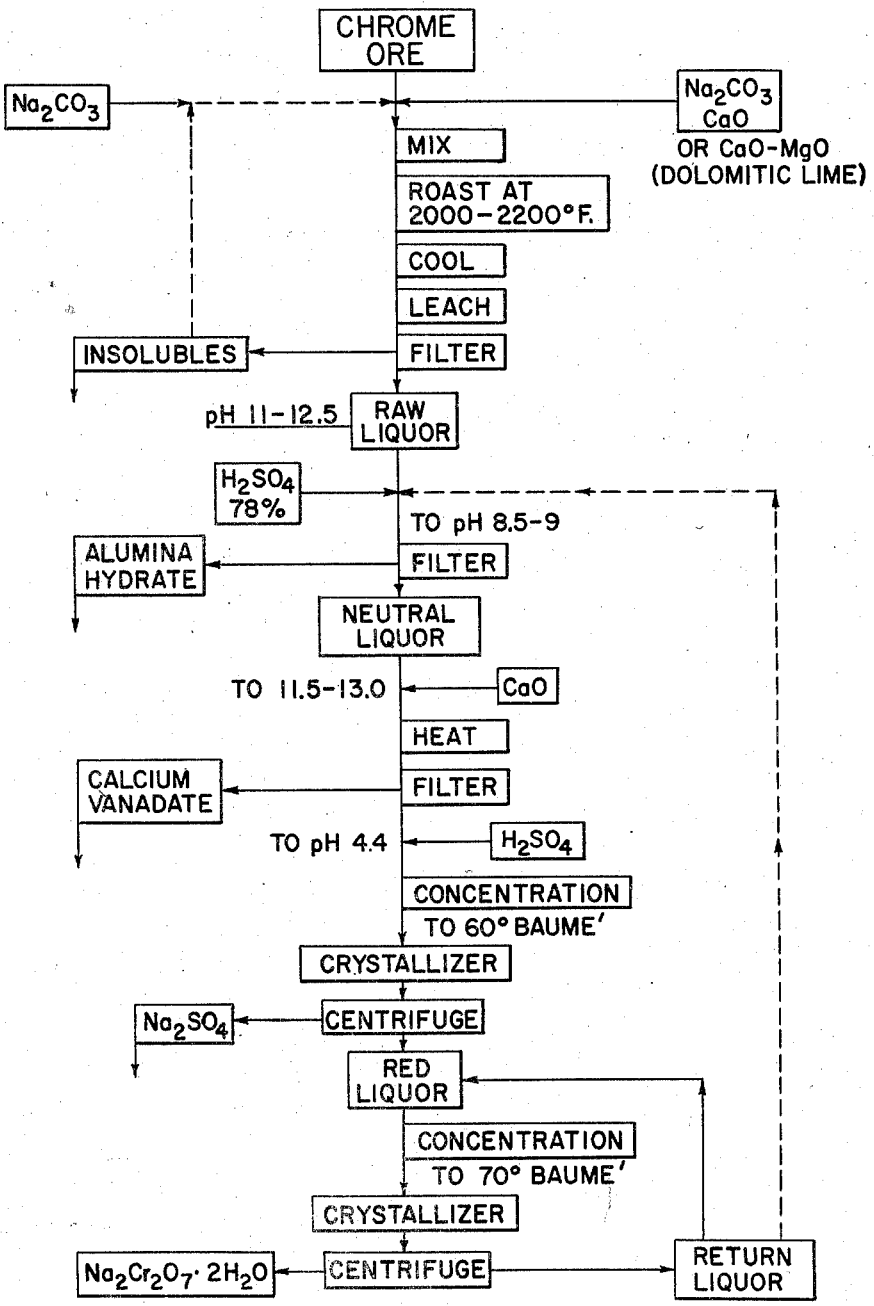
INVENTOR.
CLAYTON L. DUNNING
BY

United States Patent Office 2,839,359
Patented June 17, 1958

2,839,359

PROCESS FOR TREATING CHROMIUM-BEARING ORES

Clayton L. Dunning, Painesville, Ohio, assignor to Diamond Alkali Company, Cleveland, Ohio, a corporation of Delaware Application August 21, 1953, Serial No. 375,646

15 Claims. (Cl. 23—56)

This invention pertains to the removal of vanadium impurities from chrome liquors. More particularly, the invention is concerned with the removal of vanadium salts which are in solution with chromium salts in leach liquor, such liquor being derived from well-known chromium-containing ore treating processes. In such liquors, chromium salts predominate in high ratio and the liquors are treated for the purpose of obtaining bichromate salts substantially free of impurities. This invention is concerned primarily with liquors in which vanadium salts are present in quite minor quantities, for example, liquors which contains 0.05–0.1 gram of vanadium per liter of solute liquor.

Several processes are known for treating chrome ore for the purpose of removing vanadium, such as are referred to in Perrin and Jenkins Patent No. 2,583,591. This patent contains considerable detail as to such processes and the reference to the patent herein is for the purpose of indicating the state of the prior art in general. Moreover, this patent discloses and claims a process for treating chrome ores for the purpose of removing vanadium contaminants, though it is wholly unrelated to the present process.

The removal of vanadium values from their ores by precipitation of the calcium vanadate salt is not a new concept. For example, U. S. Patent No. 828,850 proposes the addition of water-slaked lime to a solution prepared by boiling sodium carbonate and the vanadium-containing ore with subsequent removal of calcium vanadate as a precipitate. U. S. Patent No. 1,293,402 discloses that milk of lime or calcium chloride may be employed as the precipitant in the extraction of vanadium and other materials from their ores.

U. S. Patent No. 1,392,745 discloses precipitation of vanadium by milk of lime in the presence of the magnesium ion as a calcium-magnesium vanadate, after arsenic and phosphorus are removed by precipitation as magnesium compounds.

Vedensky Patent No. 2,504,095 contains an incidental disclosure which indicates that vanadium impurities were removed from a chromate solution, from which chromium was being electrolytically recovered in the process of the patent, by adding lime and heating the solution to 95° C. Though the solution appears to be an untreated crude liquor resulting from an ore-roast leaching operation, its origin and content are not set forth. A meaningful teaching of a process having particular application is not given as, in addition to the character of the solution, other critical factors, such as pH, liquor pretreatment, reaction time and the like, are absent.

U. S. Patent No. 2,576,445 teaches the recovery of substantially all of the vanadium values present in an alkali metal vanadate solution obtained from a magnetite ore roast by adjusting the pH of solution to 7.5–8.5 and thereafter treating the solution with calcium chloride and hydrated lime. The necessity of joint use of hydrated lime and calcium chloride is emphasized, and it is indicated that the use of either separately is undesirable because the percent recovery is low.

It is entirely possible that the processes disclosed in these patents produce good results when applied to their specified purposes and proper materials. However, it is found that such processes are not of universal application. On the contrary, it is found that they are either inapplicable or lack sufficient teaching for application to certain specific problems, though the problem be related to that of the prior art, as is the case in connection with this invention. For example, milk of lime is significantly ineffective as a precipitating agent for vanadium values contained in the liquors described herein, though some precipitation is accomplished. Likewise, calcium chloride is ineffective. Lime cannot be employed effectively in the chrome recovery process hereinafter described except as taught by this invention. It is found that in order to obtain any significant quantity of vanadium precipitate by treating the liquors with which the present invention is concerned, it is necessary to select between the various stages of the liquor-treating process and employ the suggested additives only at particular points in the process and under preferred conditions.

Aside from the failures of the teachings of the prior art processes, it is to be noted that with the exception of the above-mentioned Vedensky disclosure, they are concerned with recovery rather than purification. Accordingly, solutions rich in vanadium are treated for the purpose of commercial production and the processes are not contemplated as being applicable to chrome liquors in which the quantity of vanadium impurity is very small, as in this invention. The percentage recovery achieved by the prior art processes when applied to vanadium-rich liquors may reveal a substantial and worthwhile recovery, though such processes, when applied to liquors containing only minor quantities of vanadium, as in this invention, cannot be successfully operated to achieve purification as does the present process.

It is apparent from the foregoing that the present process is in considerable contrast to those of the prior art. The process of this invention is simple of application and it provides an efficient cyclic method for the purification of the chromate liquor that may be employed continuously without the introduction of undesirable additional constituents into the liquor.

In order that this invention may be better understood and more fully appreciated, a description of a conventional process for the recovery of chromium salts from chrome-bearing ores is presented hereinafter; the invention is explained with reference to the attached drawing which forms a part hereof.

In a conventional process for treating chrome-bearing ore containing substantial amounts of aluminum, vanadium and other impurities, the ore is comminuted and mixed with sodium carbonate and calcium oxide, or in some cases, dolomitic lime. One purpose of the sodium carbonate is to react with the chromium and aluminum oxides of the ore to form water-extractable compounds thereof. Lime is employed primarily to maintain a granular consistency in the roast-mix during the roasting process which may suitably be carried out in a rotary kiln or other convenient roasting means, and secondarily, to diminish the amount of water-extractable vanadium salts formed during the roasting of the ore. The roasting of the mix is carried out at temperatures ranging between 2000° and 2200° F., after which the roast is cooled and leached with water. As a result of the leaching step, an aqueous liquor containing sodium chromate, sodium vanadate, sodium aluminate and other salts, and an insoluble residue are obtained. The liquor and residue may be separated by filtration. The residue is dried and combined with further amounts of sodium carbonate (without the addition of further quantities of lime) and is separately recycled in the roasting and leaching process, with the result that further amounts of chrome values contained in the roast residue are thereby removed. The leach liquor from the first roast and the liquor from the recycle roast are combined and are known as "raw liquor," the pH thereof being of the order of 11–12.5. This raw liquor is treated with sulfuric acid (78%), or with acidic solutions recovered subsequently in the process, to bring the pH of the raw liquor within the range of 8.5–9 in order to precipitate alumina hydrate. Alumina hydrate is derived from aluminum oxide which occurs in the ore in substantial quantities, i. e., of the order of 10–15%. This liquor may then be passed to a second filter wherein alumina hydrate is separated from the aqueous partially neutralized liquor, the filtrate then being referred to as "neutral liquor." This precipitate carries with it approximately one-half of the original vanadium values in the raw liquor, the remainder being carried into the neutral liquor.

The neutral liquor is next acidified with sulfuric acid (78%) to bring the pH of the solution to about 4.4, whereupon chromate ion is converted to bichromate ion in the solution. Thereafter, the solution may be suitably concentrated, preferably to about 60° Bé., and then is cooled to approximately room temperature. The concentration and cooling steps result in the crystallization of sodium sulfate, this taking place in a suitable crystallizer, the mother liquor comprising the chrome values as bichromate and the vanadium values as acids or acid salts thereof. The crystalline sodium sulfate is removed from the mother liquor by centrifuging. The acid mother liquor, after the removal of sodium sulfate is referred to as "red liquor." The red liquor is further concentrated in order to crystallize the bichromate values therefrom. After suitable concentration, for example, to 70° Bé., sodium bichromate crystallizes from the concentrated red liquor in a second crystallizer and is centrifuged to remove the mother liquor which liquor is referred to as "return liquor." The crystals are the finished product of the process and are, if no return liquor has been used in make-up of the red liquor, reasonably free from vanadium and other impurities. However, return liquor is usually employed, and in such case, the crystals are contaminated with vanadium to an extent of between 0.2 and 1%, taken as sodium vanadate. This amount of vanadium is sufficient to cause substantial difficulty in tanning operations and to detract seriously from the value of the bichromate as a raw material for chromate pigments.

The return liquor above referred to carries with it appreciable amounts of the chrome values as well as the vanadium values which have not been removed with the bichromate crystals. Since the return liquor has a pH of very close to that of the red liquor, it is returned to the main stream via the red liquor for further concentration and crystallization of the bichromate dissolved therein, or is returned to the main stream by combining it with the raw liquor as a part of the acid required for the reduction in pH value to the desired figure, namely about 8.5–9. It will be appreciated that such recycling of the return liquor ultimately results in accumulating an undesirable amount of vanadium salts in the system, which salts contaminate the bichromate crystals obtained therefrom and adversely affect the crystallization of bichromates. It is not economical to discard the return liquor as it contains significant quantities of bichromates.

The removal of such vanadium impurities is not without difficulties, and this invention, though quite meritorious as will appear, is not thought to eliminate all of them perfectly. Chief among several difficulties is accomplishing a high percentage removal of contaminant (by economical means) so that the bichromate is substantially unimpaired, it, of course, being possible to remove some quantity of impurity in several ways. Another problem is the avoidance of extraneous contamination by the means selected for the purification. Another condition to be avoided is undue alteration of the overall liquor treating process.

The process of the present invention is substantially free of the foregoing stated and other difficulties. In this invention, calcium oxide is supplied to the chrome liquor of the above-described conventional process under conditions resulting in substantially complete removal of vanadium impurities. Those conditions are to be described hereinafter. However, it is best first to note that though the prior art teachings may suggest that merely by adding calcium oxide to chrome liquors, calcium vanadate precipitates substantially completely, calcium vanadate does not precipitate so simply. The mere provision of calcium oxide in the liquor is almost wholly ineffective, even with application of heat for as much as an hour; this is true whether the addition is to the crude, the raw, the neutral or the red liquor as described above. Needless to say, this seems surprising after considering the prior art, and it is apparent that significant departures therefrom are necessary if the end sought by this invention is to be attained.

Notwithstanding discouraging results presented by experiments including calcium oxide, it has been found that when calcium oxide is supplied in chrome liquor at the neutral liquor stage of the herein-described conventional process in sufficient quantity to provide a final pH of about 11.5–13.0 and the mixture is heated for an extended period (during which time the pH rises to within the specified range), substantially all of the vanadium impurity precipitates as calcium vanadate and the liquor may be filtered therefrom without difficulty. Considering this result, in contrast, for example, with the result that is obtained if the identical procedure is applied at the raw liquor stage where the pH is up to 12.5, namely, no precipitate being formed at the raw liquor stage, it is believed that alumina hydrates, then present, but absent at the neutral liquor stage, inhibit precipitation of calcium vanadate. However, no explanation of the action of the alumina hydrates is suggested herein as it is not clearly understood what actually takes place at the raw liquor stage and why such hydrates might inhibit precipitation. It should be noted that the pH at the neutral liquor stage of the conventional process is about 8.5–9, which, according to this invention, must be increased to the more alkaline condition.

In general, calcium oxide may be supplied to the neutral liquor in quantities of about 1 to 33 parts CaO to 1 part $V_2O_5$; desirably, however, the CaO to $V_2O_5$ ratio is of the order of about 5–15:1. It will be recalled that the pH of the neutral liquor is about 8.5–9; thus, due to the calcium oxide that is added, the pH of the liquor during the reaction leading to precipitation is more alkaline than this, suitably of the order of about 11.5–13.0; preferably, a pH is attained of between about 12–12.6. It is possible to precipitate quantities of the impurity at a pH lower than 11.5. However, the degree of purification which is achieved by weak alkaline conditions is undesirably low. More strongly alkaline conditions than provided by pH of about 13 results in the almost complete absence of calcium vanadate formation as a precipitate.

Preferably, after the addition of calcium oxide, the liquor is heated, and heating is contained throughout the period of the reaction. In general, the mixture is heated at between about 50° and about 70° C., preferably at about 60° C. Generally it is found possible to bring about substantially complete precipitation of calcium vanadate within about 30 minutes to an hour, 45 minutes ordinarily being sufficient.

Heretofore, in discussing the process of this invention, reference has been made to the precipitating additive merely as calcium oxide. This has been primarily for convenience as, actually, it is found that the degree of excellence of result which is obtained depends, to a considerable extent, upon the form in which calcium oxide is supplied. Calcium oxide may be supplied with some degree of success in the form of slaked lime. For example, milk of lime from vertical kilns may be filtered and used as a wet mud. However, generally, one does not achieve more than about 85% removal of the vanadium impurity by the use of this material. If this material is employed, the preferred conditions that are specified herein in the process should be observed meticulously as, otherwise, the degree of impurity removal may be too low to satisfy many commercial purposes. Similarly, dolomitic lime in a fine state of sub-division may be employed if the conditions that are specified as important herein are observed. Preferably, however, calcium oxide is supplied to the process in the form of what is known as "reburner lime," sometimes referred to herein as "lime-reburner CaO." This is a material of considerable degree of purity, as compared with most other forms of lime containing from about 6 to about 15% of carbon dioxide in the form of calcium carbonate. Desirably, it is employed in the form of a substantially dry, non-hydrate-containing finely-divided solid. The reasons why better results are accomplished by the use of reburner lime are not known with certainty. However, this may be attributable to the fact that the vertical kiln lime is much harder burned and, therefore, does not contain carbon dioxide as does the reburner lime. It may be that other limes contain undesirable impurities that actually inhibit precipitation in the liquor, or it may be that the degree of hydration of other calcium oxide-containing materials adversely affects the reaction.

In using reburner lime as contemplated preferably herein, it is found that impurities are removed up to about 97%. Additionally, CaO may be provided in the liquor by adding $CaSO_4$ which, in the solution, reacts to form CaO. However, sodium hydroxide, or other suitable alkali, needs to be added to bring the pH to the desired point.

After the precipitate has formed and settled, the liquor is filtered therefrom and is after-treated for the recovery of bichromate values. However, in order to proceed in accordance with the conventional process as described herein, it is necessary to re-adjust the pH of the liquor to that of the neutral liquor, namely, to about 8.5–9, and this is accomplished by the addition of sulfuric acid. Thereafter, the recovery procedure continues as heretofore described.

In order that the invention may be better illustrated, specific examples are set forth hereinafter.

*Example 1*

To 200 mls. of chrome neutral liquor of about pH 8.4 containing approximately 0.087 gram $V_2O_5$ are added about 2.5 grams of pulverized lime reburner CaO. The mixture is agitated and heated at about 60–65° C. for a period of about 45 minutes. During this time the pH of the liquor rises to about 12.6 and calcium vanadate precipitates. The liquor is thereafter filtered from the precipitate. Analysis of the liquor reveals that it contains about 0.004 gram residual vanadium contaminant, taken as $V_2O_5$, or, in grams $V_2O_5$ per liter, about 0.022. This represents a percentage removal $V_2O_5$ of about 95%.

*Example 2*

About 80 grams of pulverized lime reburner CaO are added to about 6 liters of neutral liquor having a pH of about 8.9 and containing about 0.37 gram per liter $V_2O_5$. The mixture is heated with agitation at about 60–65° C. for a period of about 15 minutes, during which time calcium vanadate precipitates. The final pH of the reaction is found to be 11.9 and upon analysis, the residual $V_2O_5$ contaminant contained in the resulting liquor after it is filtered from the calcium vanadate is found to be about 0.059 gram per liter. This represents a removal of only 84% of the contaminant of the liquor and the example illustrates the loss of efficiency in the reaction due to the reduction of the time interval and pH for the reaction.

*Example 3*

A mixture constituted as in Example 2 is heated for a period of 30 minutes. The residual contaminant is found to be of the order of 0.022 gram per liter. This represents a removal of the vanadium oxide contaminant percentagewise of about 94%. The pH of the liquor resulting from this reaction is also 11.9.

*Example 4*

A solution constituted as in Examples 2 and 3 is heated for a period of about 45 minutes at about 60°–65° C. Upon analysis for residual vanadium oxide contaminant, it is found that the liquor contains about 0.010 gram per liter which, percentagewise, indicates that vanadium oxide has been removed to the extent of about 97.5%. The final pH of the liquor of this reaction is found to be about 12.0.

*Example 5*

A solution constituted as in Example 2 is heated for a period of about 60 minutes at about 60°–65° C. and, as in the foregoing examples, the liquor is filtered from the resulting precipitate and analyzed. The final pH of the liquor is found to be about 12.1 and residual $V_2O_5$ amounts to about 0.009 gram per liter. The percentage removal of vanadium oxide is found to be about 97.5%.

*Example 6*

To about 200 mls. of neutral liquor having a pH of about 8.5 and containing about 0.087 gram of $V_2O_5$ are added 2 grams $CaSO_4 \cdot 2H_2O$. Sufficient NaOH is added to bring the pH of the solution to about 12.5. Thereafter, the mixture is heated at about 60° C. and the reaction is allowed to proceed for about 45 minutes. Vanadium oxide is found to be present in the residual liquor in quantity of about 0.006 gram; this is about 0.031 gram per liter corresponding to about 92.8% $V_2O_5$ removed.

*Example 7*

A solution constituted as in Example 6, except that the pH is not altered by the addition of NaOH, is heated at about 60° C. for a period of about 45 minutes. Of the original 0.43 gram per liter $V_2O_5$ present in the liquor, 0.31 gram per liter is found to remain. Thus, it is apparent that in order to practice the invention successfully, it is necessary that the reaction be carried out at a higher pH. The preferred pH range has heretofore been indicated as from about 12.0–12.6.

*Example 8*

To about 200 mls. of neutral liquor having a pH of 8.5 and containing about 0.087 gram of vanadium oxide are added about 2.5 grams $Ca(OH)_2$. The mixture is heated at about 70° C. for a period of about 45 minutes with constant agitation. 0.004 gram of $V_2O_5$ is found to be present in the residual liquor which represents a contaminant removal of about 95.3%. The final pH of the liquor is found to be about 12.1.

Suitable agitation accompanies the procedure of the foregoing examples, as by a mechanical stirrer or by introducing air into the body of the liquor.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In a process for treating chromium-bearing ores for the purpose of recovering chromium values in good degree of purity which ores contain contaminants in the form of vanadium and aluminum compounds, and wherein the said chromium values and impurities are removed from the ore by first roasting said ore, and then leaching them therefrom to form a liquor, the improvement that comprises treating said liquor to effect removal of substantially all of said aluminum impurities and thereafter effecting removal of vanadium impurities at a pH of between about 11.5–13 by supplying calcium oxide in the said liquor while heating the said liquor at a temperature of about 50° to 70° C. for from about 30 to about 60 minutes, and separating the purified liquor from the precipitate so formed.

2. In a process for treating chromium-bearing ores for the purpose of recovering chromium values therefrom in a high state of purity and wherein there is obtained from the said ore a leach liquor including chromium compounds associated with various impurities including aluminum and vanadium compounds and the liquor is treated to remove aluminum compounds therefrom whereby a liquor is formed having a pH of about 8.5 to 9, the improvement which comprises, supplying to said liquor calcium oxide in such proportion as to provide a $CaO:V_2O_5$ ratio by weight of about 1–33:1, and a pH of between about 11.5–13 heating the said liquor at a temperature of about 50° to 70° C. for from about 30 to 60 minutes, and thereafter removing the liquor from the precipitate formed in the reaction.

3. A process as claimed in claim 2 wherein the said $CaO:V_2O_5$ ratio is about 5–15:1.

4. A process as claimed in claim 2 wherein lime containing less than about 6% of calcium carbonate is added to the said liquor as the supply of calcium oxide.

5. A process as claimed in claim 2 wherein calcium sulfate is added to the said liquor as the supply of calcium oxide and the pH of the said liquor is adjusted to between about 11.5 and 13 by the addition of an alkali.

6. A process as claimed in claim 3 wherein the said liquor after calcium oxide has been supplied therein is heated at about 60 to 65° C. for about 45 minutes.

7. A process as claimed in claim 6 wherein lime containing less than about 6% of calcium carbonate is added to the said liquor as the supply of calcium oxide.

8. A process as claimed in claim 6 wherein $CaSO_4$ is added to the said liquor as the supply of calcium oxide and the pH of the liquor is adjusted to between about 11.5–13 by the addition of an alkali.

9. The method of purifying alkali metal chromate solutions with respect to vanadium which solutions contain also aluminum impurities therein in the form of aluminum hydrates comprising first removing aluminum hydrates from the said solution and then supplying calcium oxide in said solution in such proportion as to provide a $CaO:V_2O_5$ ratio by weight of about 1–33:1 and a pH of between about 11.5–13, and heating the said liquor at a temperature of about 50–70° C. thereby precipitating calcium vanadate, and separating the said solution from the said precipitate.

10. A process as claimed in claim 9 wherein the said calcium oxide is associated with less than about 6% of calcium carbonate.

11. A process as claimed in claim 9 wherein the said calcium oxide is supplied in the form of lime containing less than about 6% of calcium carbonate and the solution is heated at a temperature of about 50–70° C. for a period of about 30 to 60 minutes.

12. A process as claimed in claim 11 wherein the said solution is heated at about 60° C. for a period of about 45 minutes, and wherein the $CaO:V_2O_5$ ratio by weight is about 5–15:1.

13. A process as claimed in claim 9 wherein the said calcium oxide is supplied in the form of calcium sulfate and the pH of the solution so formed is adjusted to about 11.5–13.

14. A process as claimed in claim 13 wherein the solution is heated at about 50–70° C. for about 30–60 minutes.

15. A process as claimed in claim 14 wherein the solution is heated at about 60° C. for about 45 minutes.

References Cited in the file of this patent

UNITED STATES PATENTS

| Number | Name | Date |
|---|---|---|
| 613,157 | Krebs | Oct. 25, 1898 |
| 1,430,864 | Thews | Oct. 3, 1922 |
| 2,576,445 | Cole et al. | Nov. 27, 1951 |
| 2,583,591 | Perrin et al. | Jan. 29, 1952 |
| 2,612,435 | Perrin et al. | Sept. 30, 1952 |
| 2,697,650 | Hixson et al. | Dec. 21, 1954 |

UNITED STATES PATENT OFFICE
CERTIFICATE OF CORRECTION

Patent No. 2,839,359                              June 17, 1958

Clayton L. Dunning

It is hereby certified that error appears in the printed specification of the above numbered patent requiring correction and that the said Letters Patent should read as corrected below.

Column 4, line 66, after "is", second occurrence, strike out "contained" and insert instead -- continued --.

Signed and sealed this 12th day of August 1958.

(SEAL)
Attest:

KARL H. AXLINE                               ROBERT C. WATSON

Attesting Officer                               Commissioner of Patents